(12) United States Patent
Pitbladdo

(10) Patent No.: US 8,001,805 B2
(45) Date of Patent: Aug. 23, 2011

(54) OVERFLOW DOWNDRAW GLASS FORMING METHOD AND APPARATUS

(75) Inventor: Richard B. Pitbladdo, Naples, FL (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 12/786,722

(22) Filed: May 25, 2010

(65) Prior Publication Data

US 2010/0229603 A1  Sep. 16, 2010

Related U.S. Application Data

(62) Division of application No. 11/613,265, filed on Dec. 20, 2006, now Pat. No. 7,748,236.

(60) Provisional application No. 60/754,106, filed on Dec. 27, 2005.

(51) Int. Cl.
*C03B 17/00* (2006.01)
*C03B 17/06* (2006.01)

(52) U.S. Cl. .................. 65/99.1; 65/90; 65/193; 65/199

(58) Field of Classification Search .............. 65/193
See application file for complete search history.

(56) References Cited

U.S. PATENT DOCUMENTS

| | | | |
|---|---|---|---|
| 1,565,319 A | 12/1925 | Fowle | |
| 1,673,907 A | 6/1928 | Ferngren | |
| 1,697,227 A | 1/1929 | Danner | |
| 1,731,260 A | 10/1929 | Nobbe | |
| 1,759,229 A | 5/1930 | Drake | |
| 1,829,639 A | 10/1931 | Ferngren | |
| 1,829,641 A | 10/1931 | Ferngren | |
| 1,841,579 A | 1/1932 | Fraser | |
| 1,891,370 A | 12/1932 | Danner | |
| 3,149,949 A | 9/1964 | Dockerty et al. | 65/33 |
| 3,338,696 A | 8/1967 | Dockerty | 65/145 |
| 3,433,613 A | 3/1969 | Dockerty | 65/145 |
| 3,437,470 A | 4/1969 | Overman | |
| 3,451,798 A | 6/1969 | Simon | 65/199 |
| 3,506,429 A | 4/1970 | Overman | 65/203 |
| 3,519,411 A | 7/1970 | Cortright et al. | 65/90 |
| 3,589,887 A | 6/1971 | Ward | 65/195 |
| 3,607,182 A | 9/1971 | Leibowitz | 65/53 |
| 3,682,609 A | 8/1972 | Dockerty | 65/83 |
| 3,723,082 A | 3/1973 | Knowles et al. | |
| 4,214,886 A | 7/1980 | Shay et al. | |
| 4,389,725 A | 6/1983 | Barkhau et al. | 373/40 |
| 4,416,678 A | 11/1983 | Bottger | |
| 4,738,706 A | 4/1988 | Picinelli | 65/136 |

(Continued)

FOREIGN PATENT DOCUMENTS

BE  718111  12/1968

(Continued)

OTHER PUBLICATIONS

Bottger, et al.; "LCD substrate—the future process" International Glass Review, Issue 2—2000; 3 pages.

(Continued)

*Primary Examiner* — Jason L Lazorcik
*Assistant Examiner* — Cynthia Szewczyk
(74) *Attorney, Agent, or Firm* — Siwen Chen

(57) ABSTRACT

The present invention discloses improved apparatuses for forming sheet glass. In one embodiment, the invention introduces a structural web that supports the forming structure in a manner such that the thermal creep which inevitably occurs has a minimum impact on the glass flow characteristics of the forming structure.

6 Claims, 14 Drawing Sheets

U.S. PATENT DOCUMENTS

| | | | |
|---|---|---|---|
| 5,374,595 A | 12/1994 | Dumbaugh et al. | 501/66 |
| 6,319,867 B1 | 11/2001 | Chacon et al. | 501/66 |
| 6,748,765 B2 | 6/2004 | Pitbladdo | 65/53 |
| 6,889,526 B2 | 5/2005 | Pitbladdo | 65/53 |
| 6,895,782 B2 | 5/2005 | Pitbladdo | 65/53 |
| 6,974,786 B2 | 12/2005 | Helfinstine et al. | 501/106 |
| 6,990,834 B2 | 1/2006 | Pitbladdo | 65/29.21 |
| 6,997,017 B2 | 2/2006 | Pitbladdo | 65/53 |
| 7,155,935 B2 | 1/2007 | Pitbladdo | 257/301 |
| 2001/0039814 A1 | 11/2001 | Pitbladdo | 65/193 |
| 2003/0029199 A1 | 2/2003 | Pitbladdo | 65/195 |
| 2003/0110804 A1 | 6/2003 | Fenn et al. | 65/90 |
| 2003/0192349 A1 | 10/2003 | Meda et al. | 65/53 |
| 2004/0197575 A1 | 10/2004 | Bocko et al. | 428/432 |
| 2005/0183455 A1 | 8/2005 | Pitbladdo | 65/29.11 |
| 2006/0016219 A1 | 1/2006 | Pitbladdo | 65/29.21 |

FOREIGN PATENT DOCUMENTS

| | | |
|---|---|---|
| DE | 1596484 | 7/1967 |
| DE | 1596403 | 12/1967 |
| DE | 1596402 | 12/1968 |
| DE | 2158253 | 11/1971 |
| DE | 3113505 | 1/1983 |
| DE | 3111484 A1 | 2/1983 |
| DE | 3316795 | 11/1983 |
| DE | 3111484 C2 | 12/1983 |
| DE | 3314540 | 12/1983 |
| DE | 3329843 | 5/1984 |
| DE | 3507852 | 8/1985 |
| DE | 3518137 | 1/1986 |
| DE | 4326143 | 12/1993 |
| DE | 4336046 | 4/1995 |
| DE | 19644673 | 4/1998 |
| DE | 19809878 | 9/1999 |
| DE | 19840113 | 3/2000 |
| DE | 19964043 | 7/2001 |
| DE | 100 21013 | 11/2001 |
| DE | 10028741 | 12/2001 |
| FR | 1549081 | 12/1967 |
| FR | 1549915 | 1/1968 |
| GB | 982153 | 2/1965 |
| GB | 2100401 | 7/1970 |
| GB | 1354006 | 6/1974 |
| JP | 09110443 | 4/1997 |
| JP | 10291827 | 11/1998 |
| JP | 11-246230 | 9/1999 |
| JP | 2001-80922 | 9/1999 |

OTHER PUBLICATIONS

Bocko, Peter L. and Mitchell, Mark H. "AMLCD Glass Substrates—Foundation for High-Tech Displays" The GlassReseacher, vol. 12, No. 1, pp. 26-29, 2002.

Varshneya, Arun, "Fundamentals of Inorganic Glasses", Academic Press, Inc., 1994, 00.534-540.

Snyder, R.D/Byars, E.F., "Engineering Mechanics", McGraw-Hill Book Company, 1973, pp. 349-350.

Kingery, W.D.; Bowen, H.K.; Uhlmann, D.R., "Introduction to Ceramics", John Wiley & Sons, 1976, pp. 705-767.

Pitbladdo, R.; "Overflow Downdraw Glass Forming Method and Apparatus", U.S. Appl. No. 11/553,198, filed Oct. 26, 2006; 118 pages of specification and drawings.

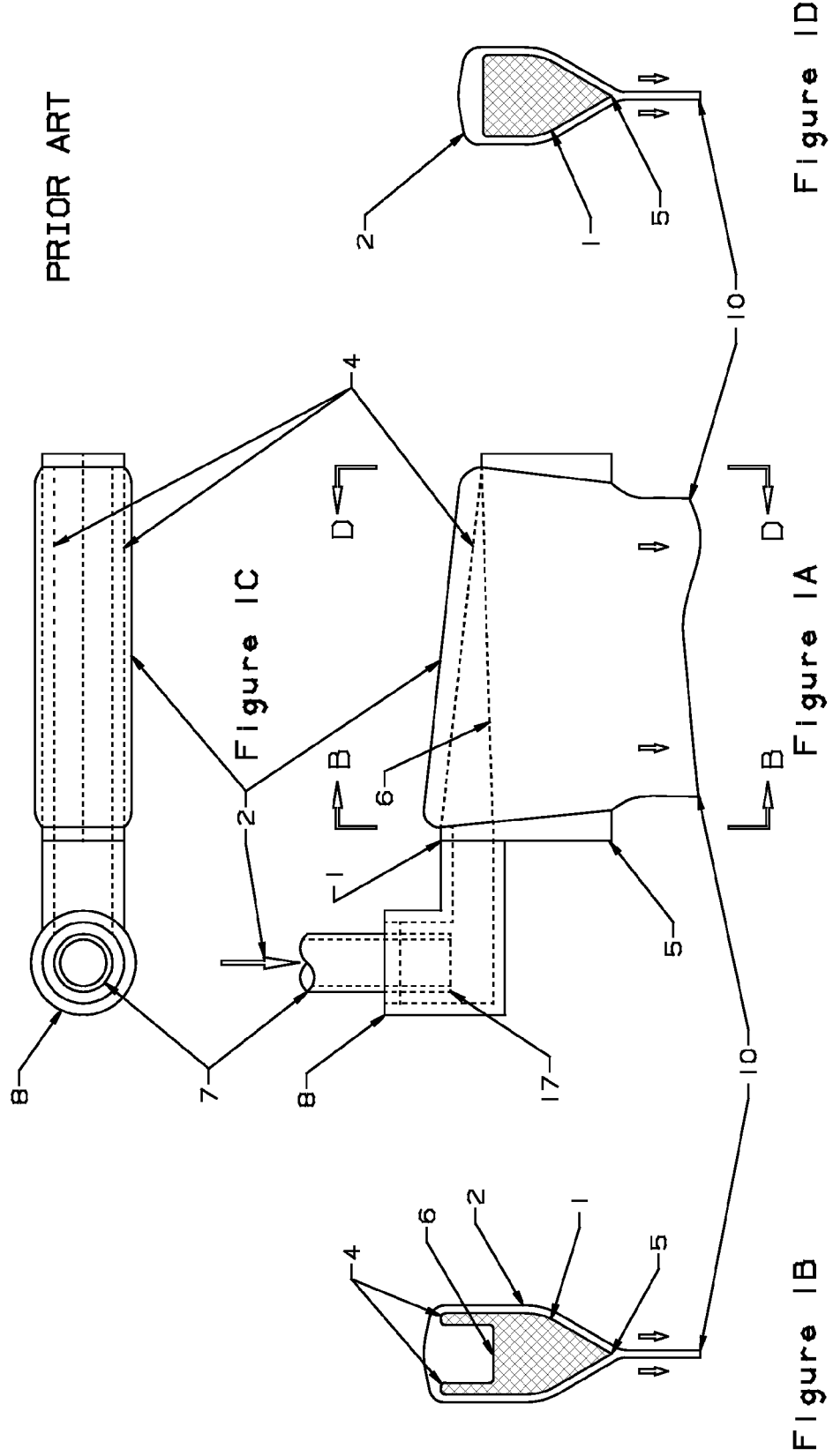

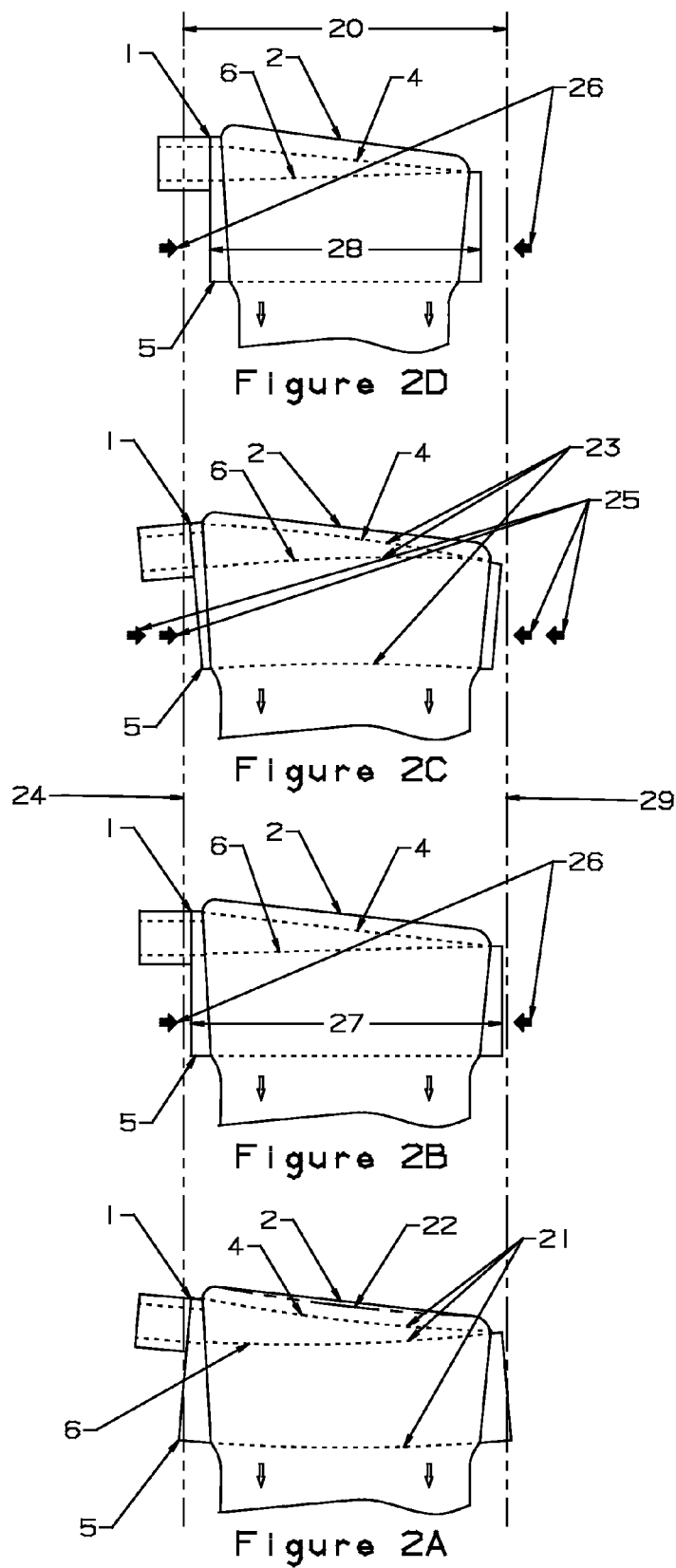

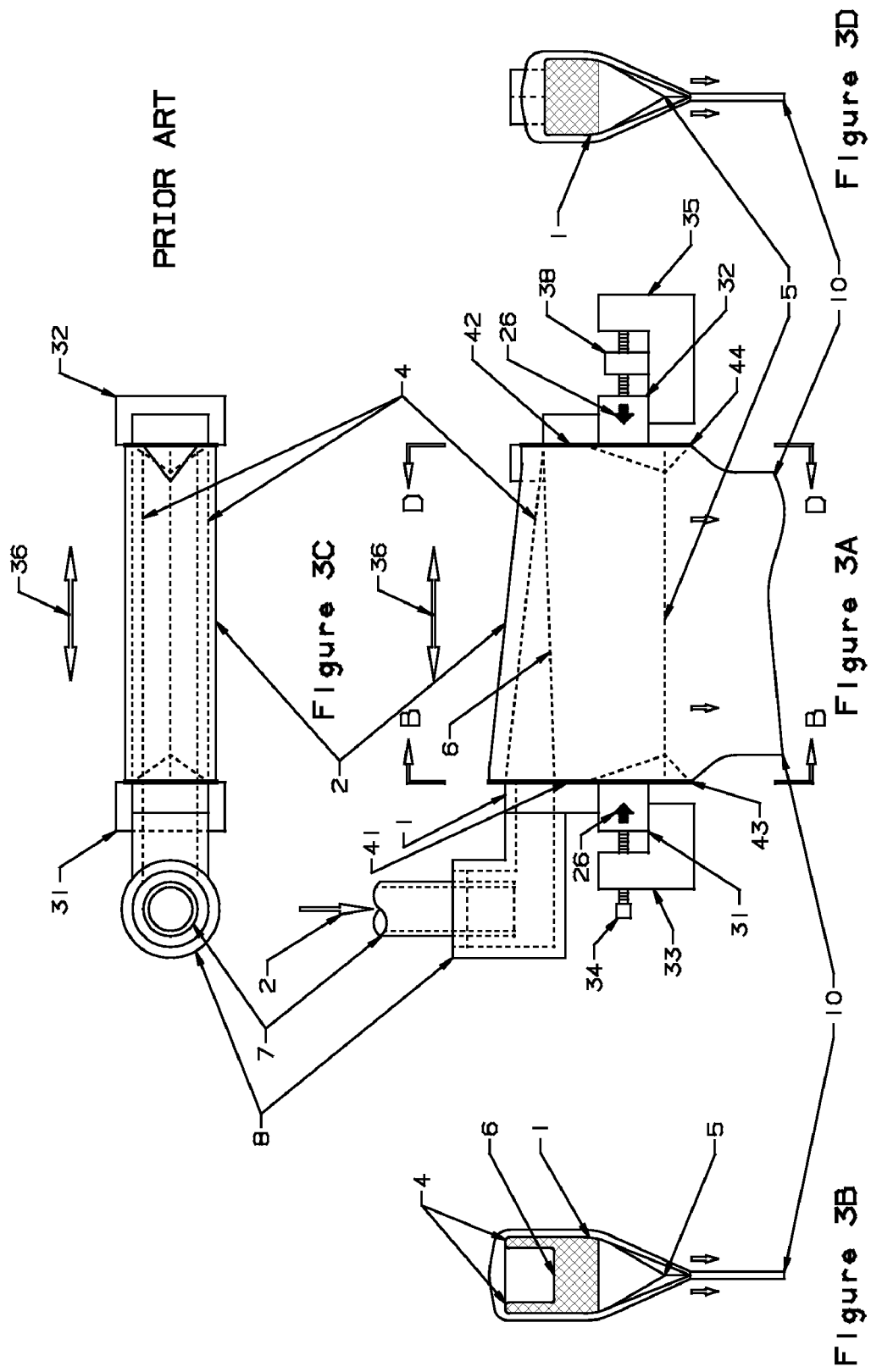

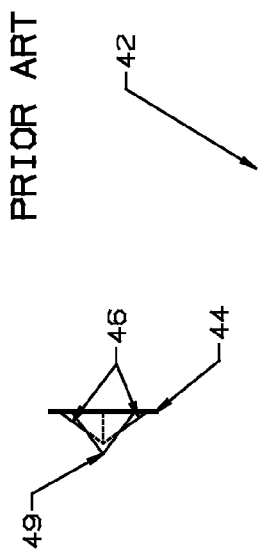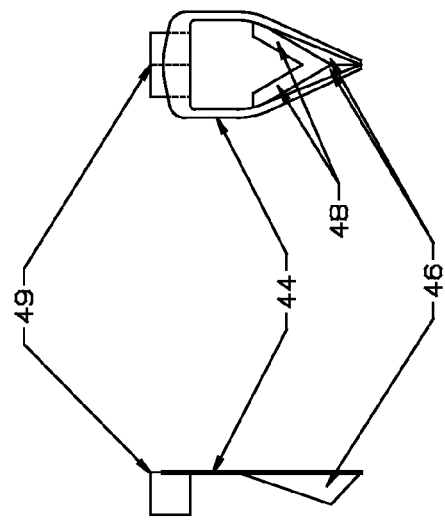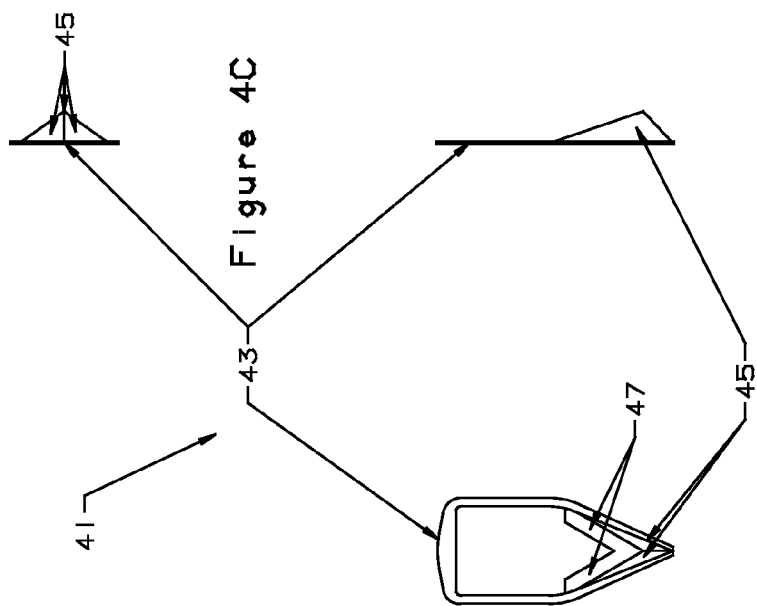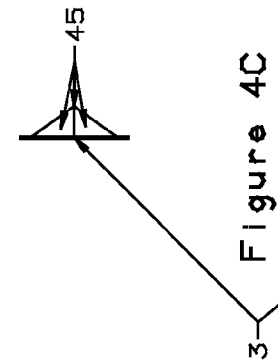
PRIOR ART
Figure 4A
Figure 4B
Figure 4C
Figure 4D
Figure 4E
Figure 4F

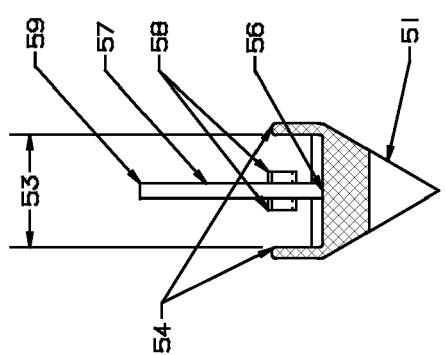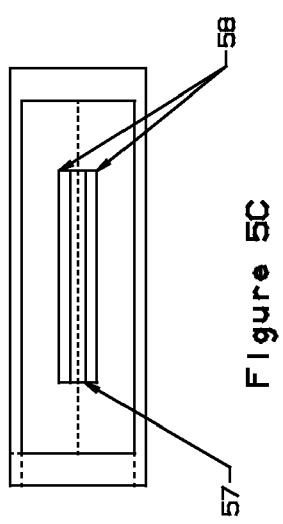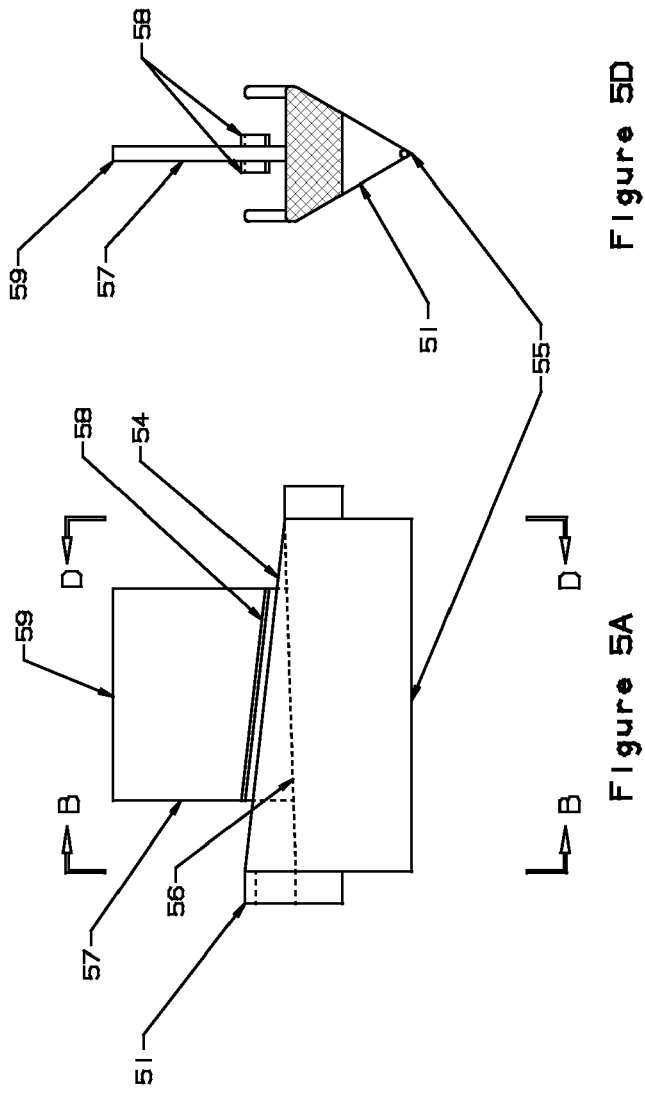
Figure 5A  Figure 5B  Figure 5C  Figure 5D

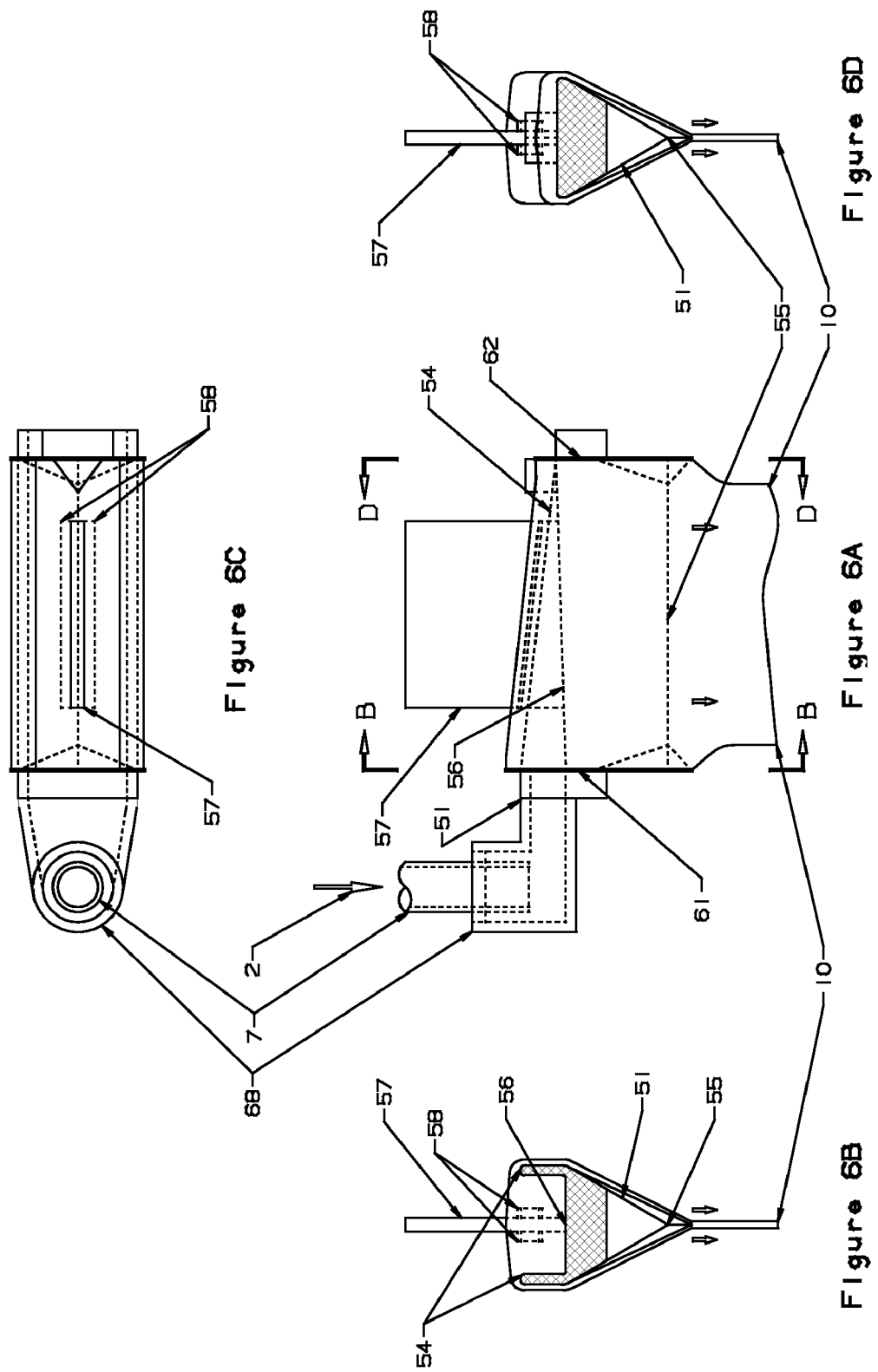

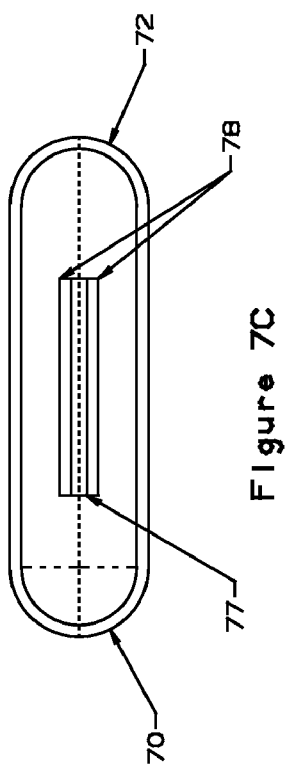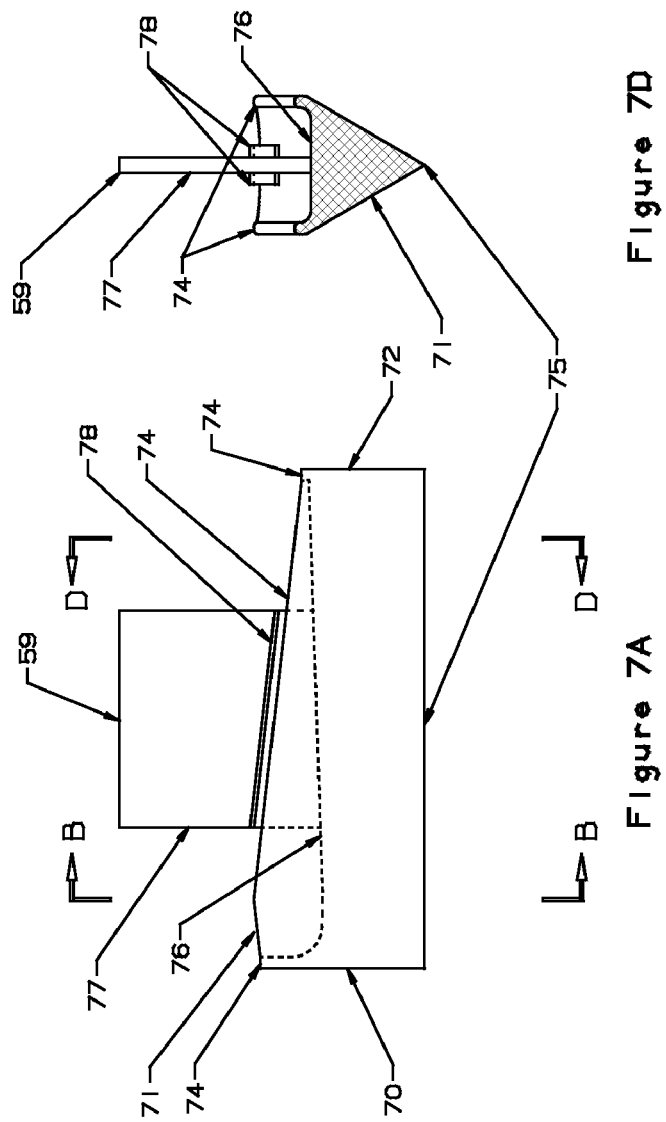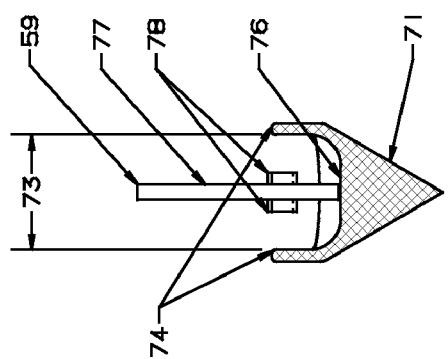

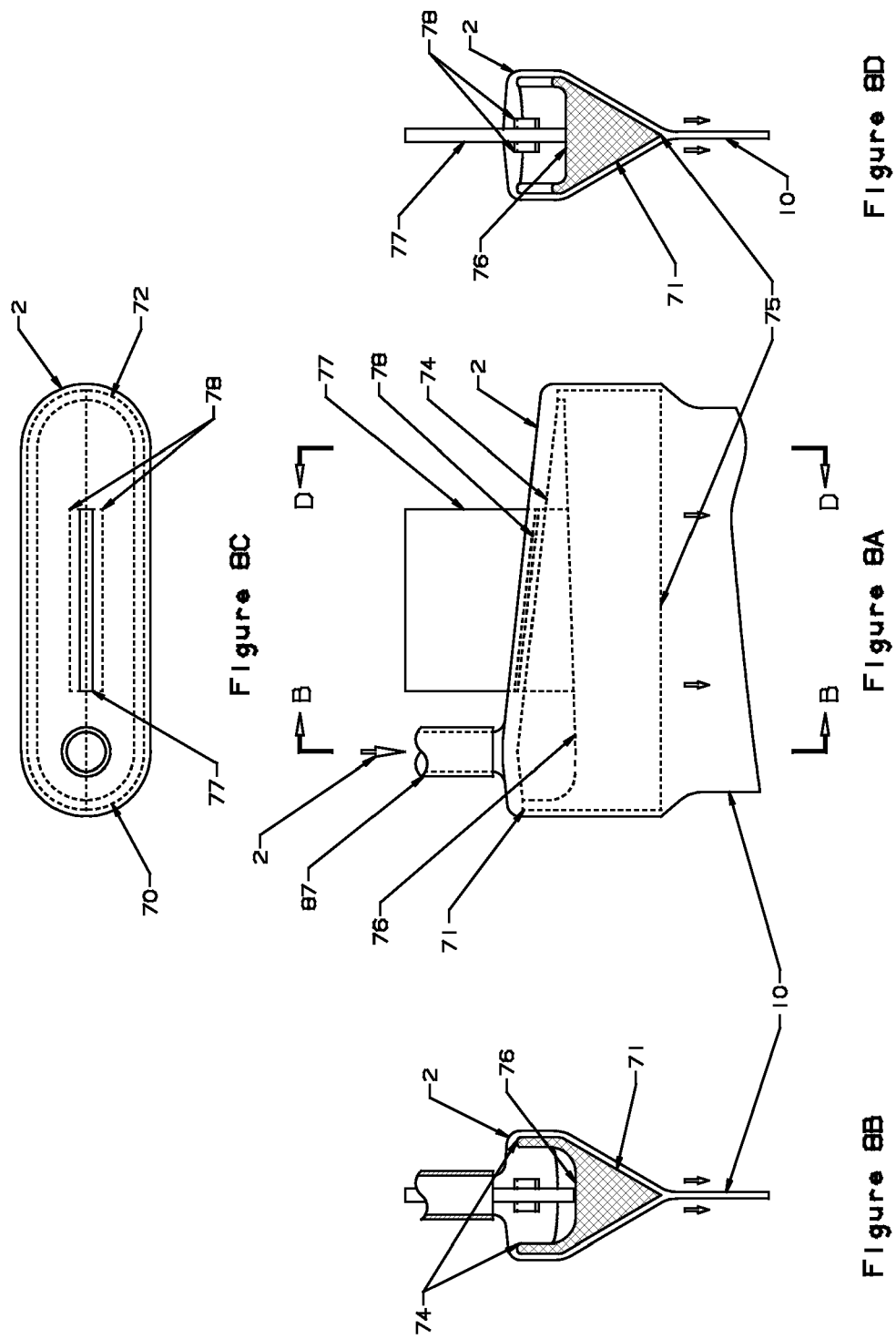

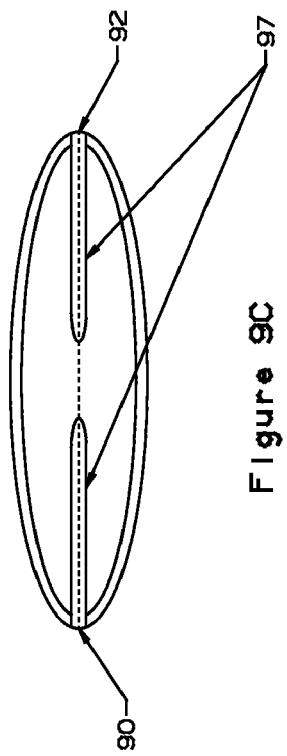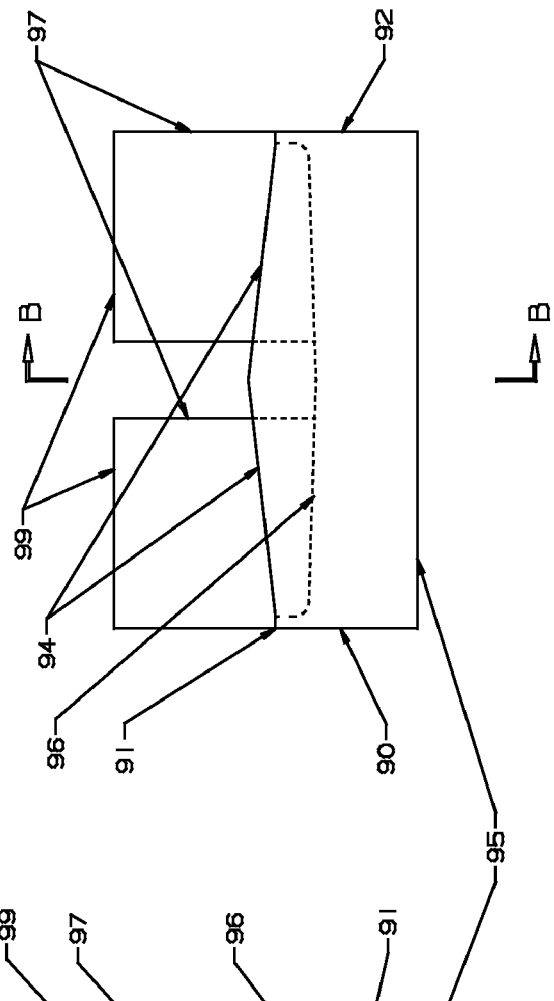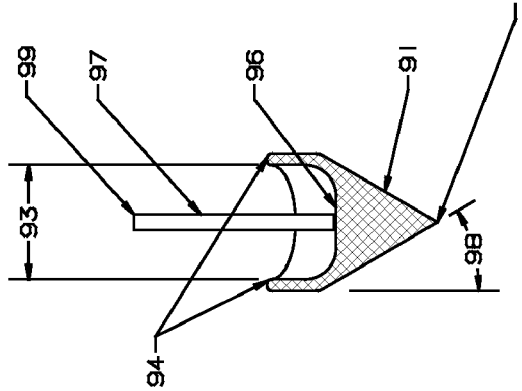
Figure 9C
Figure 9A
Figure 9B

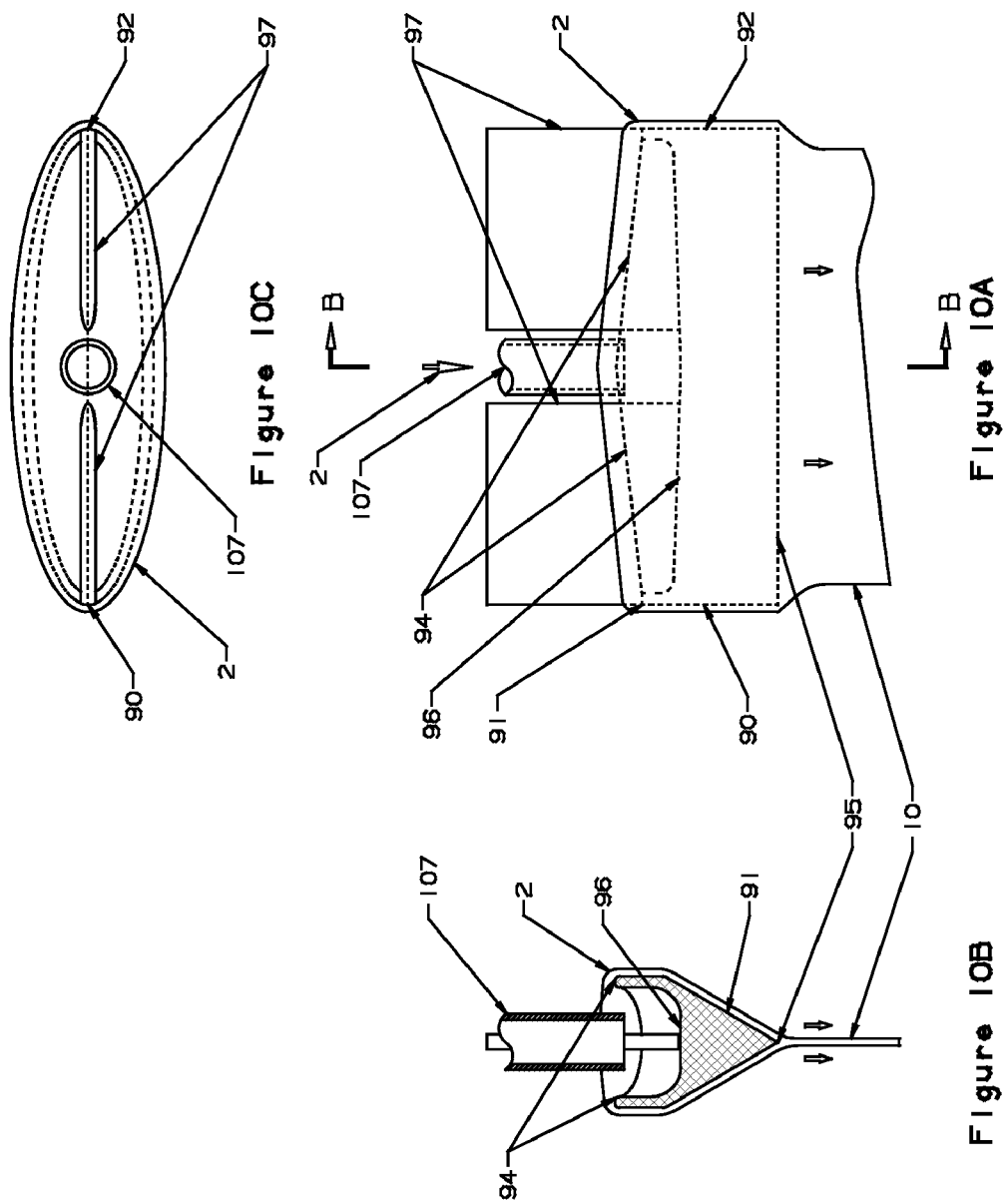

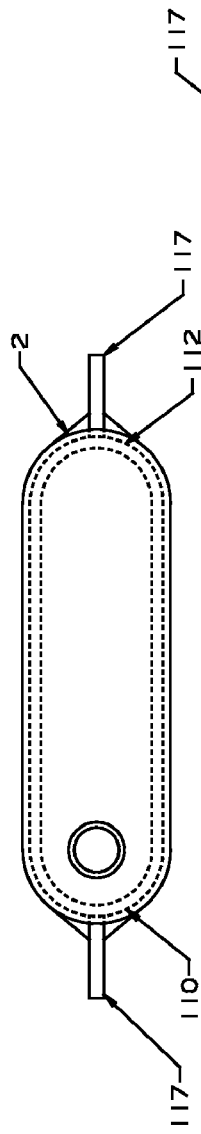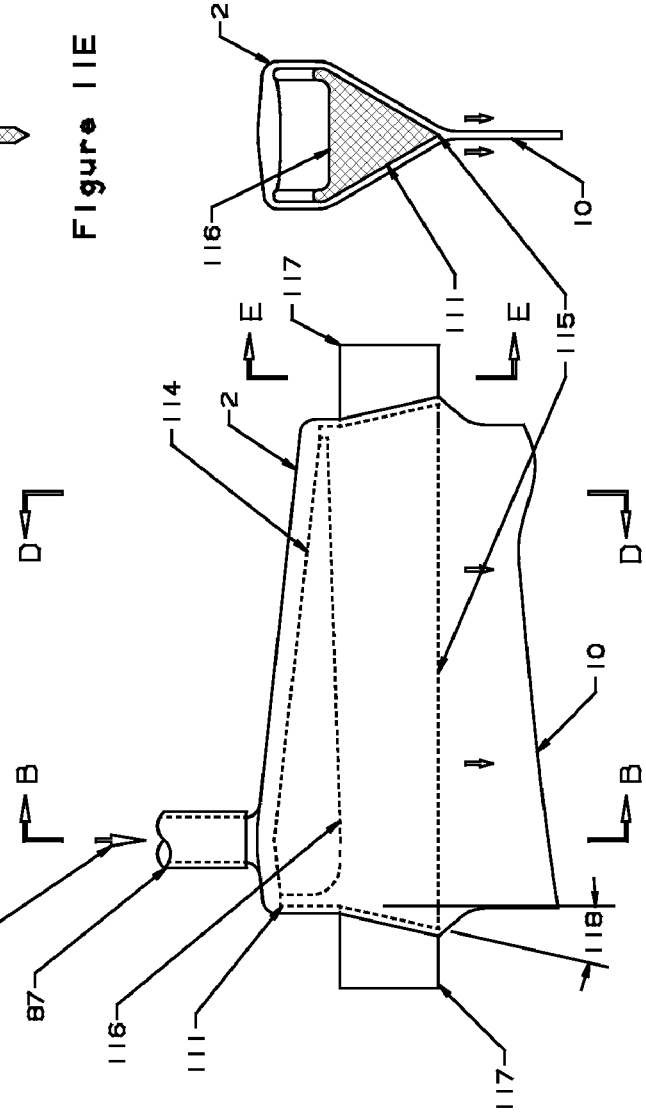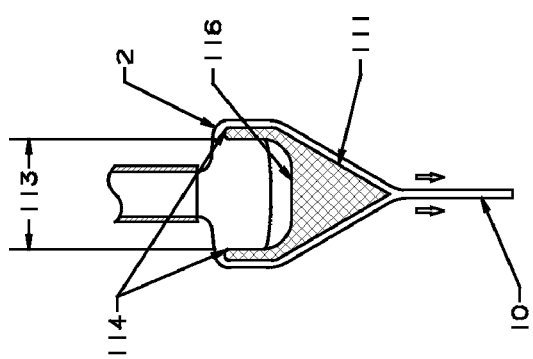

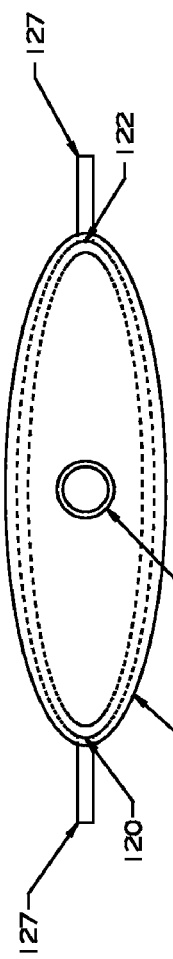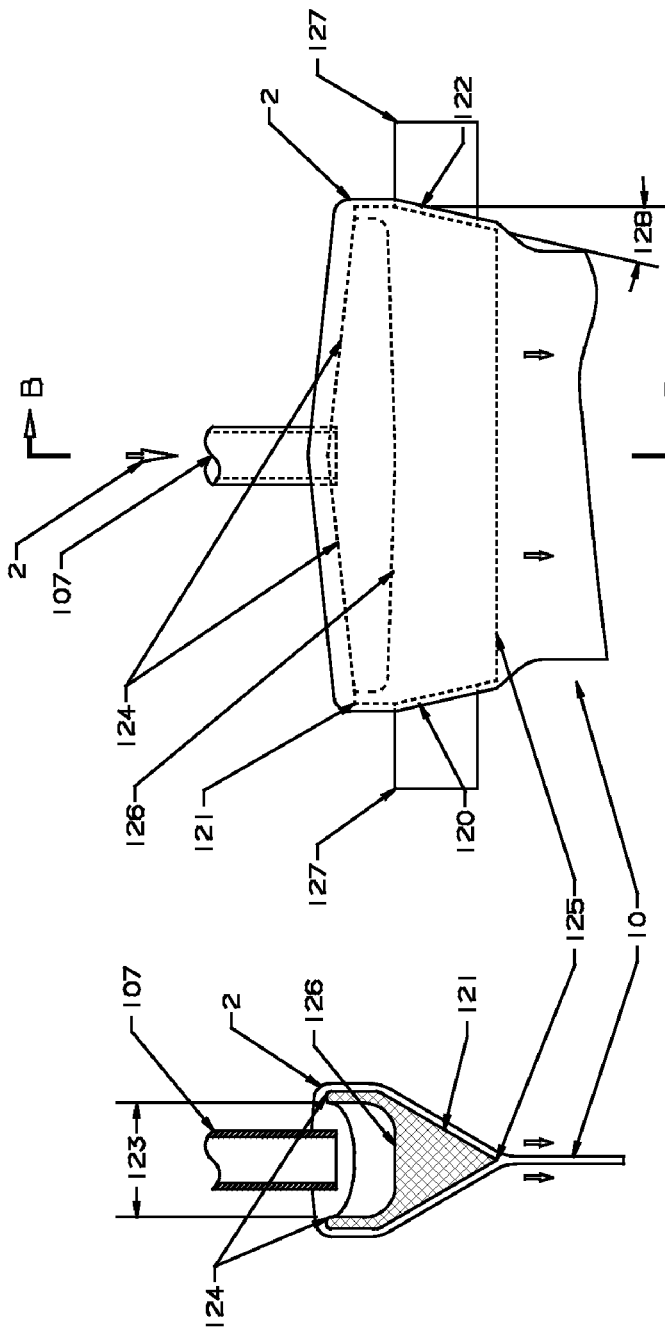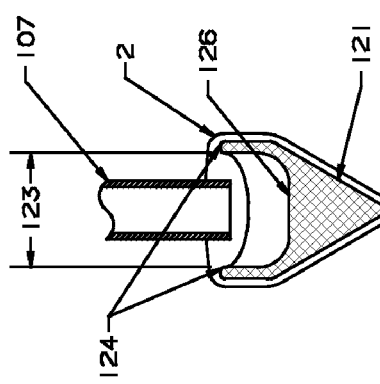

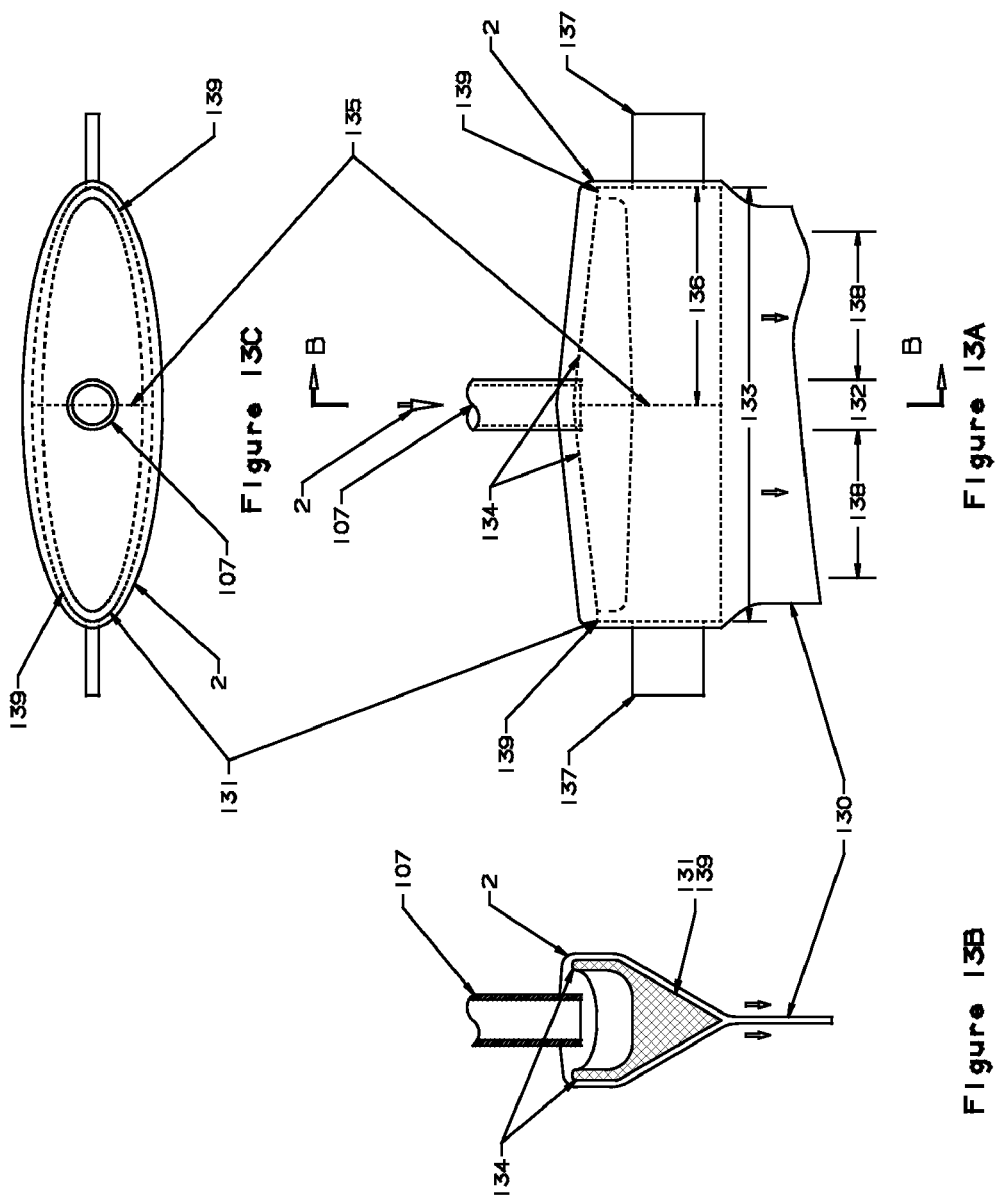

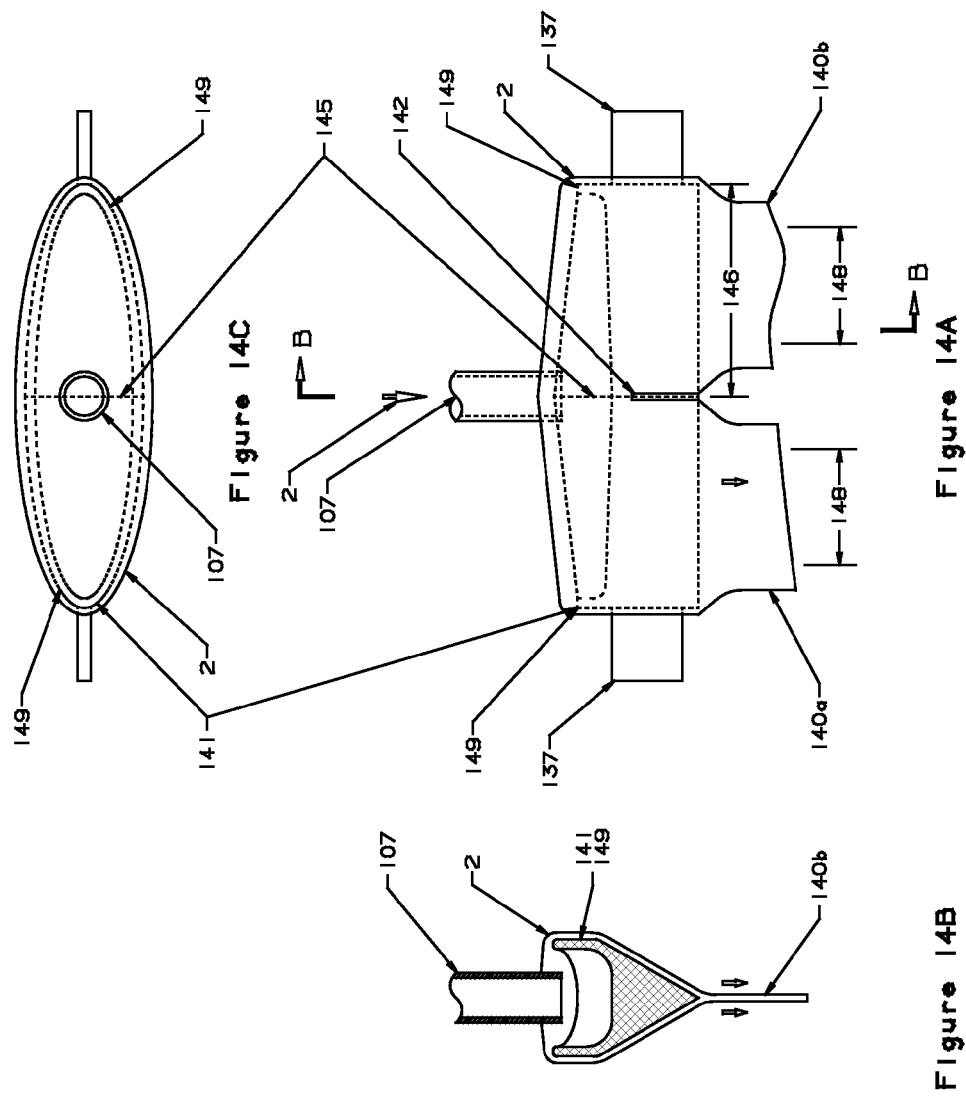

OVERFLOW DOWNDRAW GLASS FORMING METHOD AND APPARATUS

REFERENCE TO RELATED APPLICATIONS

This application is a divisional application of the application Ser. No. 11/613,265, now U.S. Pat. No. 7,748,236 filed on Dec. 20, 2006 and issued on Jul. 6, 2010, entitled "OVERFLOW DOWNDRAW GLASS FORMING METHOD AND APPARATUS," which, in turn, claims an invention which was disclosed in Provisional Application No. 60/754,106, filed Dec. 27, 2005, entitled "OVERFLOW DOWNDRAW GLASS FORMING METHOD AND APPARATUS". The benefit under 35 USC §119(e) and 35 U.S.C. §120 of the United States provisional application and the above regular application is hereby claimed, and the aforementioned applications are herein relied upon and the entire contents thereof are hereby incorporated herein by reference.

BACKGROUND OF THE INVENTION

This invention relates generally to the manufacture of glass sheet and, more particularly, to glass sheet used for the production of TFT/LCD display devices that are widely used for computer displays and for flat panel television.

DESCRIPTION OF RELATED ART

The glass that is used for semiconductor powered display applications must have very high surface quality to allow the successful application of semiconductor type material. Sheet glass made using the apparatus of U.S. Pat. No. 3,338,696 assigned to Corning, Inc. makes the highest quality glass as formed and does not require post-processing. The Corning patent makes glass by a manufacturing process termed "The Overflow Process". Glass made using other processes requires grinding and/or polishing and thus does not have as fine a surface finish. The glass sheet must also conform to stringent thickness variation and warp specifications.

FIGS. 1A through 1D illustrate the principle parts of a typical "Overflow Process" manufacturing system. The molten glass (2) from the melting furnace and forehearth, which must be of substantially uniform temperature and chemical composition, enters the forming apparatus from the downcomer pipe (7) at the downcomer pipe bottom end (17) into the inflow pipe (8) (also called an inlet pipe) and flows into the sheet forming structure (1). Examples of the glass sheet forming apparatus are found in U.S. Pat. Nos. 3,338,696 and 3,451,798. The glass sheet forming apparatus is also described in detail in U.S. Pat. Nos. 6,748,765, 6,889,526, 6,895,782, 6,990,834, and 6,997,017 and U.S. patent application Ser. Nos. 11/006,251, 11/060,139, 11/184,212, and 11/553,198 which are hereby incorporated herein by reference. The glass sheet forming apparatus includes a shallow trough on the top of a wedge shaped forming structure (1). Straight sloped weirs (4) substantially parallel with the pointed edge of the wedge, herein termed the root (5), form each side of the trough in the forming structure (1). The trough bottom (6) and the sides of the trough are contoured in a manner to provide even distribution of the glass (2) to the top of each side weir (4). The molten glass (2) then flows through the trough, over the top of each side weir (4), down each side of the wedge shaped sheet forming structure (1), and joins at the root (5) to form a sheet of molten glass. The molten glass is then cooled as it is pulled off the root (5) to form a solid glass sheet (10) of substantially uniform thickness.

The refractory materials from which the forming structure and its support structure are made have high strength in compression and low strength in tension. Like most structural materials they also change shape when stressed at high temperature by a phenomenon termed "thermal creep".

FIGS. 2A through 2D illustrate the typical effects of thermal creep on the shape of the forming structure when the end support and compression blocks impart different compression stress in the bottom of the forming structure (1) near the root (5). FIG. 2A shows that with no compression loading, the forming structure (1) sags in the middle such that the top of the weirs (4) and the root (5) are now curved (21) and the trough bottom (6) has a change in curvature (21). This longitudinal curvature (21) causes the molten glass (2) to no longer flow with constant thickness (22) over the weirs (4). More specifically, the longitudinal curvature (21) allows more glass to flow over the middle of the weirs resulting in an uneven sheet thickness distribution. The forming structure (1) has an initial longitudinal length (20) as defined by the phantom lines (24) and (29). With no external loading the weirs (4) get shorter and the root (5) gets longer.

FIG. 2B shows that sagging of the forming structure is minimized under the optimum longitudinal compression loading (26) of the lower section of the forming structure (1) near the root (5). With optimal loading both the weirs (4) and the root (5) shorten equally to longitudinal length (27). FIG. 2C shows that if too great a longitudinal compression load (25) is applied to the lower section of the trough (1) near the root (5), the root (5) is compressed excessively, thus producing a convex longitudinal curvature (23) to the trough weirs (4), the trough bottom (6), and the root (5). The root (5) shortens considerably more than the weirs (4) as can be seen by the movement relative to the phantom lines (24) and (29). FIGS. 2A through 2C represent the effect of thermal creep over the same time period. FIG. 2D shows a forming structure (1), which has shortened a greater amount to longitudinal length (28). This increased shortening is caused by imparting the correct longitudinal load (26) for the increased time of a substantially longer production campaign. This increased shortening has an adverse effect on the width of the manufactured sheet.

U.S. Pat. No. 3,451,798 teaches that a sheet glass edge control device, termed "edge director" herein, must be installed at each end of the trough to prevent narrowing of the formed sheet as a result of surface tension. FIG. 3A through 3D show the prior art edge director assemblies (41) and (42) shown in FIGS. 4A through 4F attached to the ends of the trough forming structure (1). The flanges (47) of the inflow edge director assembly (41) are compressed against the forming structure (1) by the inflow support and compression block (31). The inflow support and compression block (31) rests on the inflow end support structure (33) and is held in position by the adjustment bolt (34). The flanges (48) of the far end edge director assembly (42) are compressed against the forming structure (1) by the far end support and compression block (32). The far end support and compression block (32) rests on the far end structure (35) and is held in position by the force motor (38). A force motor (38) is a device that generates a substantially constant linear force (26), in a longitudinal direction (36). The energy required to maintain this force (26) may be supplied by gravitational, pneumatic, hydraulic, or mechanical means. Some examples of force motors include, but are not limited to, an adjustable spring assembly, a mechanical adjustment device that is constantly or periodically monitored and adjusted, an air cylinder, an air powered motor, a hydraulic cylinder, a hydraulic powered motor, a solenoid, an electric motor, or a weight and lever system.

FIGS. 4A through 4C are side, end, and top views of the inflow end edge director (41) as used in the prior art. The inflow end edge director (41) has a fence (43) to which the glass attaches such that the width is maintained. The edge director (41) also has symmetrical edge director surfaces (45) that provide for gravity to assist the flowing glass to attach to the fence, and flanges (47) that are used to secure the edge director to the inflow end of the forming structure (1).

FIGS. 4D through 4F are side, end, and top views of the far end edge director (42) as used in the prior art. The far end edge director (42) has a fence (44) to which the glass attaches such that the width is maintained. The edge director (42) also has symmetrical edge director surfaces (46) that provide for gravity to assist the flowing glass to attach to the fence, and flanges (48) that are used to secure the edge director to the far end of the forming structure (1). Attached to the outlet edge director (42) is a wedge shaped protrusion, herein termed a plow (49), which aids in the control of the glass flow over the weirs (4) near the far end edge director (42).

The edge directors are normally fabricated via welding from platinum sheet or platinum alloy sheet (platinum herein). In the prior art, the edge directors are fixed to each end of the forming structure. Thus, as the campaign progresses and the forming structure becomes shorter via thermal creep, the manufactured sheet becomes narrower. This results in fewer square feet of production, and required process changes.

The forming structure of the prior art is made from a single block of refractory material which is isostatically pressed. The size capability of presently available equipment for isostatic pressing limits the dimensions of the forming structure.

A major drawback of the apparatus of "The Overflow Process" is that the forming apparatus deforms during a manufacturing campaign in a manner such that the glass sheet no longer meets the thickness and width specifications. This is a primary cause for premature termination of the production run.

Another drawback is that the edge directors are required because the glass does not flow over the ends of the forming structure.

Another drawback of the apparatus is that the production rate is limited by the size forming structure.

SUMMARY OF THE INVENTION

The present invention is a significant modification of "The Overflow Process" that embodies design features that support the forming apparatus in a manner such that the deformation that results from thermal creep has a minimum effect on the thickness variation of the glass sheet.

The glass "Sheet Forming Apparatus" normally designed for use in "The Overflow Process" (U.S. Pat. No. 3,338,696) relies on a specifically shaped forming structure to distribute the glass in a manner to form sheet of a uniform thickness. The basic shape of this forming trough is described in detail in U.S. Pat. No. 3,338,696. Structurally the forming structure is a beam, which is supported at each end. The sheet glass forming process is conducted at elevated temperatures, typically between 1100° C. and 1350° C. At these temperatures the materials used for construction of the forming structure exhibit a property called thermal creep, which is deformation of the material caused by applied stress at elevated temperatures. Thus, the forming structure deforms under the stress caused by own weight.

Embodiments of this invention suspend the forming structure from the top in a manner such that the thermal creep, which inevitably occurs, has a minimum impact on the glass flow characteristics of the forming structure. In these embodiments there are no externally applied compression loads on the forming structure and any moments that produce sagging of the forming structure are minimized. Thus sheet glass may be manufactured for a longer time without requiring changing of the forming structure.

In other embodiments of this invention the glass flows over the ends of the forming structure, thus completely enveloping the forming structure.

Other embodiments of this invention also allow for the doubling of the length of the forming structure, thus proportionally increasing the production rate.

Like the present overflow process, this invention forms the sheet glass surfaces from virgin glass from the center of the glass flow stream.

BRIEF DESCRIPTION OF THE DRAWINGS

FIG. 1A is a side view of the prior art overflow downdraw sheet glass forming apparatus.

FIG. 1B is a cross-section of the forming structure shown in FIG. 1A across lines B-B.

FIG. 1C is a top view of the prior art overflow downdraw sheet glass forming apparatus.

FIG. 1D is a cross-section of the forming structure shown in FIG. 1A across lines D-D.

FIG. 2A is an illustration of the thermal creep deformation of the glass forming structure under the load of its own weight.

FIG. 2B is an illustration of the thermal creep deformation of the glass forming structure under an applied load that minimizes vertical deformation.

FIG. 2C is an illustration of the thermal creep deformation of the glass forming structure under excessive applied load.

FIG. 2D is an illustration of the thermal creep deformation of the glass forming structure under an applied load that minimizes vertical deformation over the extended period of a production campaign.

FIG. 3A is a side view of the prior art overflow downdraw sheet glass forming apparatus showing the edge directors, the support and compression blocks, and the end support structures for both the inflow end and the far end of the forming structure.

FIG. 3B is a cross-section of the forming structure shown in FIG. 3A across lines B-B.

FIG. 3C is a partial top view of the prior art overflow downdraw sheet glass forming apparatus shown in FIG. 3A.

FIG. 3D is a cross-section of the forming structure shown in FIG. 3A across lines D-D.

FIG. 4A is a side view of the prior art inflow end edge director.

FIG. 4B is an end view of the prior art inflow end edge director.

FIG. 4C is a top view of the prior art inflow end edge director.

FIG. 4D is a side view of the prior art far end edge director.

FIG. 4E is an end view of the prior art far end edge director.

FIG. 4F is a top view of the prior art far end edge director.

FIG. 5A is a side view of an embodiment of the present invention schematically illustrating a center support web that provides for the support of the forming structure from the top.

FIG. 5B is a cross-section of the forming structure shown in FIG. 5A across lines B-B.

FIG. 5C is a partial top view of the embodiment of this invention shown in FIG. 5A.

FIG. 5D is a cross-section of the forming structure shown in FIG. 5A across lines D-D.

FIG. 6A is a side view of an embodiment of the present invention schematically illustrating the components and assembly for the forming structure that is shown in FIGS. 5A through 5D.

FIG. 6B is a cross-section of the forming structure shown in FIG. 6A across lines B-B.

FIG. 6C is a partial top view of the embodiment of this invention shown in FIG. 6A.

FIG. 6D is a cross-section of the forming structure shown in FIG. 6A across lines D-D.

FIG. 7A is a side view of an embodiment of the present invention schematically illustrating a center support web that provides for the support of the forming structure from the top and has no end support structure.

FIG. 7B is a cross-section of the forming structure shown in FIG. 7A across lines B-B.

FIG. 7C is a partial top view of the embodiment of this invention shown in FIG. 7A.

FIG. 7D is a cross-section of the forming structure shown in FIG. 7A across lines D-D.

FIG. 8A is a side view of an embodiment of the present invention schematically illustrating the components and assembly for the forming structure that is shown in FIGS. 7A through 7D.

FIG. 8B is a cross-section of the forming structure shown in FIG. 8A across lines B-B.

FIG. 8C is a partial top view of the embodiment of this invention shown in FIG. 8A.

FIG. 8D is a cross-section of the forming structure shown in FIG. 8A across lines D-D.

FIG. 9A is a side view of an embodiment of the present invention schematically illustrating the center support web that provides for the support of the forming structure from the top, has no end support structure, and has a shape that requires no edge directors.

FIG. 9B is a cross-section of the forming structure shown in FIG. 9A across lines B-B.

FIG. 9C is a partial top view of the embodiment of this invention shown in FIG. 9A.

FIG. 10A is a side view of an embodiment of the present invention schematically illustrating the components and assembly for the forming structure that is shown in FIGS. 9A through 9C.

FIG. 10B is a cross-section of the forming structure shown in FIG. 10A across lines B-B.

FIG. 10C is a partial top view of the embodiment of this invention shown in FIG. 10A.

FIG. 11A is a side view of an embodiment of the present invention showing the forming structure supported by end mounts.

FIG. 11B is a cross-section of the forming structure shown in FIG. 11A across lines B-B.

FIG. 11C is a partial top view of the embodiment of this invention shown in FIG. 11A.

FIG. 11D is a cross-section of the forming structure shown in FIG. 11A across lines D-D.

FIG. 11E is a cross-section of the mounting block shown in FIG. 11A across lines E-E.

FIG. 12A is a side view of an embodiment of the present invention showing the forming structure supported by end mounts.

FIG. 12B is a cross-section of the forming structure shown in FIG. 12A across lines B-B.

FIG. 12C is a partial top view of the embodiment of this invention shown in FIG. 12A.

FIG. 13A is a side view of an embodiment of the present invention showing a forming structure that produces glass sheet with substantially twice the width of the prior art sheet.

FIG. 13B is a cross-section of the forming structure shown in FIG. 13A across lines B-B.

FIG. 13C is a partial top view of the embodiment of this invention shown in FIG. 13A.

FIG. 14A is a side view of an embodiment of the present invention showing a forming structure which produces two sheets of substantially the same width as the prior art sheet.

FIG. 14B is a cross-section of the forming structure shown in FIG. 14A across lines B-B.

FIG. 14C is a partial top view of the embodiment of this invention shown in FIG. 14A.

DESCRIPTION OF THE PREFERRED EMBODIMENTS

The refractory materials from which the forming trough and its support structure are made have high strength in compression and low strength in tension. Like most structural materials they also change shape when stressed at high temperature by a process termed "Thermal Creep". These material characteristics and how these characteristics affect the manufacturing process are the reason for this invention.

FIGS. 5A through 5D illustrate a forming structure (51) which is supported from the top at surface (59) by a center support web (57). The support web (57) is attached to the bottom (56) of the trough in the forming structure (51). For clarity of illustration the support web (57) is shown as being rectangular in cross section and having a longitudinal length less than that of the weirs (54) on the forming structure (51). In practice the longitudinal length of the support web (57) is optionally the full length of the weirs (54) and could even extend back into the inflow pipe (68). The cross section would be streamlined to facilitate smooth flow of the glass. Because the support web (57) is attached on the centerline of the forming structure (51) it produces a restriction to the glass flow. The width of the forming structure (53) between the weirs (54) will be greater than the forming structure width in the prior art. Attached to the support web (57) is a flow control web (58) which guides flow to the far end unusable edge of the formed glass sheet.

FIGS. 6A through 6D show the forming structure (51) as part of the assembled sheet glass forming apparatus. The glass (2) is fed to a downcomer pipe (7), which feeds an inflow pipe (68) similar to the prior art inflow pipe (8) that is adapted to fit the wider forming structure (51). The edge directors (61) and (62) are similar to the prior art edge directors (41) and (42), but adapted to fit the wider forming structure (51). The glass (2) flows down the two parallel troughs past the support web (57) and the flow control web (58), flows over the weirs (54), down the inverted wedge surfaces to the root (55) of the forming structure (51) and forms the glass sheet (10).

The shape and size of the flow control web (58), the cross-section and length of the support web (57) where it is submerged in the glass (2), and the width (53) between the weirs (54) in combination with the shape of the trough bottom (56) and of the weirs (54), would be determined using the simulation technologies of Computational Fluid Dynamics (CFD) and Oil Modeling.

FIGS. 7A through 7D illustrate another embodiment of this invention whereby the forming structure (71), which is supported from the top at surface (59) by a center support web (77), has a weir (74) encircling the top of the forming structure, and has rounded ends (70) and (72). The center support web (77) is attached to the bottom (76) of the trough in the forming structure (71). The glass flows over the weir (74) and down all sides of the forming structure (71) joining at the root (75) of the forming structure (71) such that the glass completely envelopes the forming structure (71).

FIGS. 8A through 8D show the forming structure (71) as part of the assembled sheet glass forming apparatus. The glass (2) is fed to a downcomer pipe (87) similar to that in the prior art, which discharges the glass directly onto the top surface of the glass in the forming structure. No edge directors are shown, but some type of flow control apparatus would be required at each end (70) and (72). The glass (2) flows down the two parallel troughs past the support web (77) and flow control web (78), flows over the weir (74) on each side and each end (70) and (72), down the inverted wedge surfaces to the root (75) and forms the glass sheet (10). The shape of the bottom and the location of the bottom of the downcomer pipe (87) are both critical to maintaining uniform flow over the weir (74). The bottom of the downcomer pipe (87) may be below the glass surface as shown in FIG. 10A.

The shape and location of the bottom of the downcomer pipe (87), the shape and size of the flow control web (78), the cross section and length of the support web (77) where it is submerged in the glass (2), the shape of the ends (70) and (72), and the width (73) between the weirs (74), in combination with the shape of the trough bottom (76) and of the weirs (74), would be determined using the simulation technologies of Computational Fluid Dynamics (CFD) and Oil Modeling and would be periodically improved based on manufacturing experience.

FIGS. 9A through 9C illustrate a forming structure (91) which is supported from the top at surface (99) by two support webs (97). The support webs (97) are attached to the bottom (96) of the trough in the forming structure (91). The cross section of the support webs (97) is streamlined to facilitate smooth flow of the glass. The weirs (94) completely encircle the top of the forming structure (91). The forming structure has a shape in the horizontal plane that is substantially an ellipse. This somewhat elliptical shape is such that edge directors are not required at the ends (90) and (92). The angle (98) of the inverted slope varies in the longitudinal direction such that the increase in the gravitational force in the longitudinal direction on the vertically flowing glass (2) is such to counteract the effect of the surface tension of the glass (2) as it flows to the root (95) of the forming structure (91).

FIGS. 10A through 10C show the forming structure (91) as part of the assembled sheet glass forming apparatus. The glass (2) is fed to a downcomer pipe (107), similar to that in the prior art, which discharges the glass under the top surface of the glass (2) in the forming structure. The glass (2) flows in the parallel troughs past the support web, flows over the weir (94) on each side and each end (90) and (92), down the inverted wedge surfaces to the root (95) of the forming structure (91) and forms the glass sheet (10). The shape of the bottom and the location of the bottom of the downcomer pipe (107) are both critical to maintaining uniform flow over the weir (94). The bottom of the downcomer pipe (107) may be above the glass surface as shown in FIG. 8A.

The shape and location of the bottom of the downcomer pipe (107), the horizontal cross section of the forming structure (91), the variation of the inverted slope angle (98), the cross section and length of the support webs (97) where they are submerged in the glass (2), and the width (93) between the weirs (94), in combination with the shape of the trough bottom (96) and of the weirs (94), would be determined using the simulation technologies of Computational Fluid Dynamics (CFD) and Oil Modeling and would be periodically improved based on manufacturing experience.

The somewhat elliptical horizontal shape of forming structure (91) in FIGS. 9A through 9C can also be incorporated as a feature in the shape of the ends (70) and (72) of the forming structure (71) in FIGS. 7A through 7D. In the embodiment shown in FIGS. 9A through 9C, the somewhat elliptical horizontal shape is shown as encompassing the entire periphery of the forming structure. In additional embodiments the somewhat elliptical horizontal shape may be limited to the end portions (90) and (92) of the forming structure.

The support webs (57), (77), and (97), which support the weight of the forming structure and the glass (2) in and on the forming structure are loaded in tension. The refractory materials, Zircon and Alumina, normally used to construct the forming structure would not be suitable for this part of the forming apparatus assembly. A refractory metal, such as molybdenum, would be preferable for the construction of the support webs (57), (77), and (97). The molybdenum would preferably be clad in platinum or platinum alloy to protect it from oxidation. The refractory material of the forming structure, such as Zircon, would then be attached to the support webs (57), (77), and (97).

FIGS. 11A through 11E show a forming structure (117) similar in shape to forming structure (71) of FIG. 7A through 7D supported from the ends by mounting blocks (117) at each end. The mounting blocks (117) have a thin streamlined profile as shown by the section in FIG. 11E such as to have minimum interference with the molten glass (2) flowing over the ends ((110) and (112)) of the forming structure (111) and down each side of the mounting blocks (117). The vertical flow of the glass (2) at each end (110) and (112) is on a substantially vertical surface at angle (118). The range of angle (118) is 0 to 20 degrees. The glass (2) flows over the weir (114) on each side and each end (110) and (112), down the wedge surfaces to the root (115) and forms the glass sheet (10). The shape of the bottom and the location of the bottom of the downcomer pipe (87) are both critical to maintaining uniform flow over the weir (114). The bottom of the downcomer pipe (87) may be below the glass surface as shown in FIG. 10A.

The shape and location of the bottom of the downcomer pipe (87), the shape and angle (118) of the ends (110) and (112), and the width (113) between the weirs (114), in combination with the shape of the trough bottom (116) and of the weirs (114), would be determined using the simulation technologies of Computational Fluid Dynamics (CFD) and Oil Modeling and would be periodically improved based on manufacturing experience.

FIGS. 12A through 12C show a forming structure (121) similar in shape to forming structure (91) of FIG. 9A through 9C supported from the ends by mounting blocks (127) at each end (120) and (122). The mounting blocks (127) have a thin streamlined profile similar to that shown by the section in FIG. 11E so that there is minimum interference with the molten glass flowing over the ends ((120) and (122)) of the forming structure (121) and down each side of the mounting blocks (127). The vertical flow of the glass (2) at each end (120) and (122) is on a substantially vertical surface at angle (128). The range of angle (128) is preferably 0 to 20 degrees. The glass (2) flows over the weir (124) on each side and each end (120) and (122), down the inverted wedge surfaces to the root (125) and forms the glass sheet (10). The shape of the bottom and the location of the bottom of the downcomer pipe (107) are both critical to maintaining uniform flow over the weir (124).

The shape and location of the bottom of the downcomer pipe (87), the shape and angle (128) of the ends (120) and (122), and the width (123) between the weirs (124), in combination with the shape of the trough bottom (126) and of the weirs (124), would be determined using the simulation technologies of Computational Fluid Dynamics (CFD) and Oil Modeling and would be periodically improved based on manufacturing experience.

Either the angle (118) or (128), which are shown in FIGS. 11A and 12A respectively, may be optionally incorporated in the shape of the ends of the embodiments of forming structures (71), (91), (111), and (121).

A refractory metal, such as molybdenum, would be preferable for the construction of the mounting blocks ((117) and (127)) because the thin profile implies high loading which would result in substantial thermal creep. The molybdenum would preferably be clad in platinum or platinum alloy to protect it from oxidation.

Another method of protecting the refractory metal, such as molybdenum, from oxidation is to operate the process in a reducing atmosphere.

FIGS. 13A through 13C show an embodiment of this invention whereby the production rate of the forming apparatus may be substantially increased. This embodiment comprises two forming structure blocks (139) of length (136) placed end to end such that the combined length of the forming structure (131) is length (133). Length (136) is the maximum length isostatically pressed refractory that can be procured. Combining two blocks end to end produces a forming structure (131) with twice the width (133), which in turn makes a glass sheet (130) that is substantially twice as wide as prior art sheet. The forming structure blocks (139) are compressed together by the mounting blocks (137) and join at the plane (135). A keying mechanism, not shown, would be required at plane (135) to insure correct alignment of the two forming structure blocks (139).

In the embodiments of this invention shown in FIGS. 10A through 10C, FIGS. 12A through 12C, and FIGS. 13A through 13C the most challenging technical development is controlling the glass flow over the weirs (94), (124), and (134) in the center of the forming apparatus near the bottom of the downcomer pipe (107). If the glass (2) flow control is not accurate in this region of the sheet (130), the quality in area (132) in the center of the sheet (130) will not meet specification. The two useable width (138) sections of the sheet (130) will be substantially the same sheet width as made with an apparatus that uses a single piece forming structure.

FIGS. 14A through 14C show an embodiment of this invention which produces two strips of sheet (140a) and (140b). Two forming structure blocks (149) of length (146) are compressed together at plane (145) by the mounting blocks (137) to make the forming structure (141). A flow divider (142) is provided at the center plane of the forming structure (141) to separate the glass flow such that two separate sheets (140a) and (140b) are formed. The sheets each have useable widths (148) which are substantially the same sheet width as made with an apparatus that uses a single piece forming structure.

The forming structures (71), (91), (111), and (121) are normally made from refractory materials such as Zircon and Alumina. An additional feature of the embodiments of this invention that use forming structures (71), (91), (111), and (121) is that the forming structure is completely enveloped in glass during glass sheet forming operations. The forming structure material would then optionally be a refractory metal such as molybdenum. The glass, which encases the molybdenum forming structure structure, would protect the molybdenum from oxidation.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. An apparatus for forming sheet glass, the apparatus comprising a weir including opposed sides and two outer end portions extending between the opposed sides, wherein the opposed sides and the two outer end portions encircle a top of a wedge shaped sheet forming structure to provide a trough for receiving molten glass, the wedge shaped sheet forming structure including downwardly sloping sides converging along a flow direction to a bottom of the wedge shaped sheet forming structure such that a glass sheet is formed when molten glass flows over the opposed sides of the weir, down the downwardly sloping sides of the wedge shaped sheet forming structure along the flow direction and meets at the bottom of the wedge shaped sheet forming structure, and wherein the two outer end portions of the weir are each curved along a plane perpendicular to the flow direction such that molten glass additionally flows over the curved outer end portions, down the curved outer end portions, maintaining contact with that molten glass flowing down the sloping side portions wedge shaped sheet forming structure, and forming the end section of the glass sheet; such that more uniform edge sections are formed.

2. The apparatus of claim 1, wherein the curved outer end portions are each, respectively, an inflow end and a far end of the sheet forming apparatus.

3. The apparatus of claim 2, wherein each curved outer end portion is shaped such that the molten glass flows over the entire length of each curved outer end portion, thus joining the molten glass flowing on each side of the sheet forming apparatus at both curved outer end portions, such that the molten glass completely envelopes the forming portion of the sheet forming apparatus.

4. The apparatus of claim 1, wherein the curved outer end portions are each shaped such that the molten glass flows over the entire length of the curved outer end portions, thus joining the molten glass flowing on each side of the sheet forming apparatus.

5. The apparatus of claim 1, wherein the flow of the glass down outer end portions of the apparatus is at an angle with respect to the vertical.

6. The apparatus of claim 5, wherein the flow of glass down outer end portions of the apparatus is at an angle between plus and minus 20 degrees with respect to the vertical.

* * * * *